United States Patent [19]
Jenkins et al.

[11] Patent Number: 5,558,460
[45] Date of Patent: Sep. 24, 1996

[54] APPARATUS FOR ENHANCING WAVE HEIGHT IN OCEAN WAVES

[76] Inventors: Scott A. Jenkins, 14765 Kalapana St., Poway, Calif. 92064; Joseph Wasyl, 4529 Mount Henry Pl., San Diego, Calif. 92117; Charles Robins, 2110 Avenida de La Playa, La Jolla, Calif. 92037

[21] Appl. No.: 206,501

[22] Filed: Mar. 3, 1994

[51] Int. Cl.⁶ .................................................. E02B 3/06
[52] U.S. Cl. ................................. 405/29; 405/16; 405/21
[58] Field of Search .......................... 405/34, 21, 18, 405/16, 15, 52, 29–33, 35; 210/170

[56] References Cited

U.S. PATENT DOCUMENTS

| | | | |
|---|---|---|---|
| Re. 24,632 | 4/1959 | Danel et al. ............................... | 405/29 |
| Re. 32,054 | 12/1985 | Mehlum . | |
| 969,967 | 9/1910 | MacDonald ................................ | 405/77 |
| 1,010,139 | 11/1911 | Haupt ......................................... | 405/34 |
| 1,137,049 | 4/1915 | Callahan ..................................... | 405/34 |
| 1,314,361 | 8/1919 | Phillips ....................................... | 405/77 |
| 1,928,473 | 9/1933 | Wood .......................................... | 405/34 |
| 1,973,821 | 9/1934 | Mason ......................................... | 61/30 |
| 2,028,794 | 1/1936 | Matthes ................................ | 405/21 X |
| 2,069,715 | 2/1937 | Arpin . | |
| 2,435,576 | 2/1948 | Danel . | |
| 2,441,759 | 5/1948 | Gay . | |
| 2,820,148 | 1/1958 | Southwick . | |
| 3,886,751 | 6/1975 | Porraz Jimenez Labora . | |
| 4,034,231 | 7/1977 | Conn et al. . | |
| 4,363,564 | 12/1982 | Borgren . | |
| 4,420,275 | 12/1983 | Ruser .................................... | 405/15 X |
| 4,690,585 | 9/1987 | Holmberg ............................. | 405/18 X |
| 5,259,695 | 11/1993 | Mostkoff .................................. | 405/29 |

*Primary Examiner*—Dennis L. Taylor
*Attorney, Agent, or Firm*—Brown, Martin, Haller & McClain

[57] ABSTRACT

The artificial reef of the present invention is constructed from a plurality of structural units each of which is a tetrahedron-shaped sandbag, which are arranged in a talus pile. The reefs are formed by dropping the structural units in the desired locations. The tetrahedron-shape of the structural units provides a self-interlocking structure which can be placed en mass on the sea floor without individual alignment of each bag. The geometry of the reef structure is a sloped bar, a parallel bar, or a V-shaped bar, or combinations thereof. The parallel bars, which run parallel to the shoreline, trap standing waves between the bars to reinforce the incoming waves with a maximum energy focused where the rays of trapped waves cross the wave rays of the incoming swell. A multiple V-shaped bar configuration, with the apex of the V pointing diagonal to the incoming waves creates Bragg reflection patterns which cause crossing wave rays to form local concentrations of wave energy.

9 Claims, 5 Drawing Sheets ated at $2.5 \times 10^{12}$ W globally, present wave energy
APPARATUS FOR ENHANCING WAVE HEIGHT IN OCEAN WAVES

BACKGROUND OF THE INVENTION

Although the available power of ocean wind wave has been calculated at $2.5 \times 10^{12}$ W globally, present wave energy recovering technology is only marginally economical even along a high energy coastline such as the United Kingdom. This is in large part due to limited available energy density, which requires large numbers of energy collectors to be strung out along a given length of coastline in order to recover economically feasible quantities of wave energy.

A number of attempts have been made to focus tidal and wave energy into a limited area to allow for efficient conversion for power production, including those disclosed in the patents of Arpin (U.S. Pat. No. 2,069,715), Danel (U.S. Pat. No. 2,435,576), Gay (U.S. Pat. No. 2,441,759), Southwick (U.S. Pat. No. 2,820,148), Conn, et al. (U.S. Pat. No. 4,034,231), Borgren (U.S. Pat. No. 4,363,564) and Mehlum (Re 32054). The Danel, Gay, Southwick and Borgren patents each describe the use of sea walls of various geometries which are designed to channel wave energy to one or more focal points. The Mehlum patent discloses a variation on the solid converging sea walls or channels which involves the creation of a diffraction grating formed from discrete structures arranged in a grid pattern. The grid pattern becomes a Fresnel lens, focusing the energy by diffracting the incoming waves. Finally, the Conn, et al. patent relies only partially on redirection of wave energy. Instead, this device is a V-shaped pier-like structure with a number of water turbines distributed at different points of the structure. Rather than bringing the waves to the turbine, or the conversion device, the turbines are distributed to utilize a section of the wave front.

A common concern of each of these devices is the sea wall or channel. The construction of permanent structures can be expensive and potentially environmentally destructive by altering the local ocean current patterns. Also, changes in sea topography due to storms and erosion can cause the ideal location for energy collector placement to shift, rendering an expensive permanent structure less effective.

The need for a portable reef or sea wall has been addressed in U.S. Pat. Nos. 2,069,715 of Arpin and 3,886,751 of Porraz Jimenez Labora.

The artificial reef of Arpin is limited in that its structure is relatively shallow, either in a triangular or semicircular cross section. While some modifications of wave patterns in shallow water is possible, the entire purpose of this artificial reef is to provide a nucleation point to accumulate sand to form a sandbar. This type of structure would not be effective in providing sufficient wave channeling for energy conversion purposes.

The aquatic construction modules of Poraz Jimenez Labora come closer to meeting the needs of a portable, sturdy structure for modifying water flow patterns. However, the interlocking edges of the modules must be individually aligned and linked together during assembly of the reef or other protective barrier. This procedure, while suitable for construction of temporary levees and channels well in advance of flooding, where rapid assembly of the barrier is not critical, is extremely impractical for construction in existing bodies of water, especially in the presence of ocean swells, using conventional floating cranes and riggings.

SUMMARY OF THE INVENTION

It is an advantage of the present invention to provide a structural unit for formation of artificial reefs for diverting and channeling wave energy and water in general.

It is another advantage of the present invention to provide an artificial reef structure for channeling wave energy for energy collection.

It is still another advantage of the present invention to provide an optimized artificial reef structure for enhancing the energy of a collected wave.

In an exemplary embodiment the artificial reef of the present invention is constructed from a plurality of structural units each of which is a tetrahedron-shaped sandbag, which are arranged in a talus pile. With the exception of the tetrahedron-shape, the sandbags themselves are constructed according to conventional sandbag technology, using the same materials and assembly techniques. Typically, sandbags are made from polypropylene or polyester fabric bags which are filled with sand. A minimum of five layers thick of the structural units is required in the talus pile to reduce the permeability of the reef to less than five percent. This level of permeability is important to obtain a solid body response.

The reefs are formed by dropping the structural units in the desired locations. The tetrahedron-shape of the structural units provides a self-interlocking structure which can be placed en mass on the sea floor without individual alignment of each bag.

The geometry of the reef structure is a sloped bar, a parallel bar, or a V-shaped bar, or combinations thereof. The seaward slope is important in determining the amount of energy which can be focused, while the parallel bar or V-shaped bar focuses energy to discreet locations. The parallel bars, which run parallel to the wave front, trap standing waves between the bars to reinforce the incoming waves with a maximum energy focused where the rays of trapped waves cross the wave rays of the incoming swell.

A multiple V-shaped bar configuration, with the apex of the V pointing diagonal to the incoming waves creates Bragg reflection patterns which cause crossing wave rays to form local concentrations of wave energy.

BRIEF DESCRIPTION OF THE DRAWINGS

Understanding of the present invention will be facilitated by consideration of the following detailed description of the preferred embodiment of the present invention, taken in conjunction with the accompanying drawings in which like reference numerals refer to like parts and in which.

DESCRIPTION OF THE PREFERRED EMBODIMENT(S)

Figure 1:
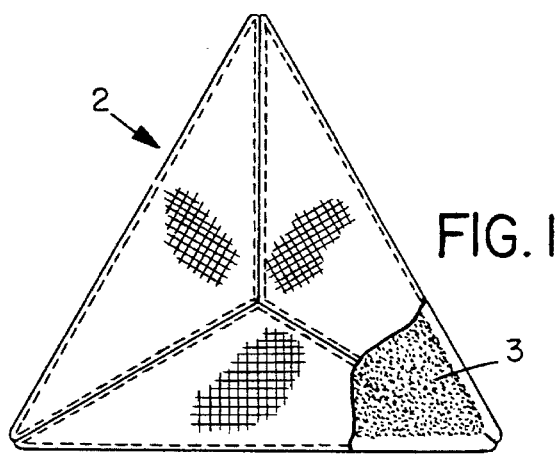
FIG. 1 is a perspective view of a structural unit of the present invention, partially cut away.
Figure 2B:
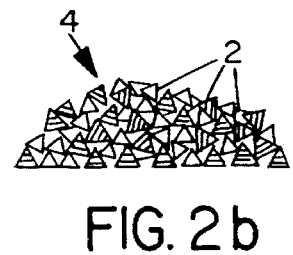
FIG. 2a is a front elevation and FIG. 2b is a side elevation of an artificial reef according to the present invention.
Figure 2A:
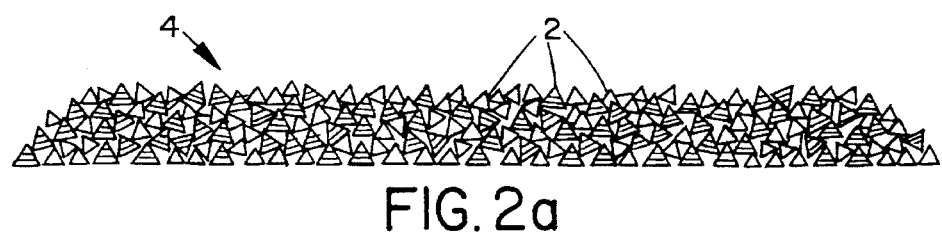
Figure 3:
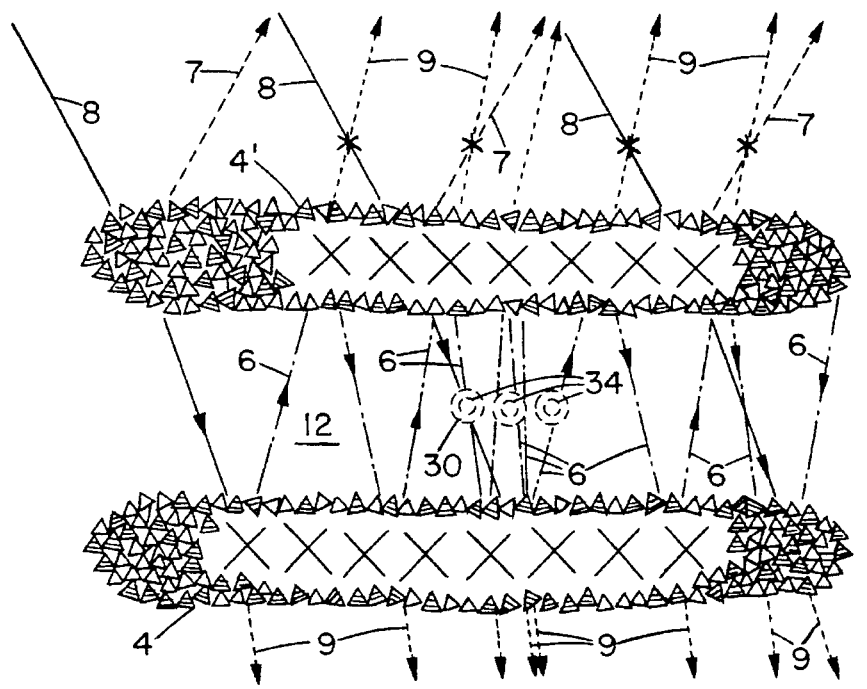
FIG. 3 is a top view of a parallel bar arrangement.

As illustrated in FIG. 1, the structural unit 2 is a sandbag formed by sewing together triangular sheets of polypropylene or polyester fabric, typically woven, to form a tetrahedron-shaped bag within which sand 3, gravel, or a sand/gravel mixture is retained. Generally, any type of filler with a similar weight and conformability may be used, including gels or liquids. For simplicity, further descriptions will identify the filler as "sand", which can include any of the above-identified fillers and their equivalents. The dimensions of each structural unit 2 may vary, however, in the preferred embodiment, structural units with heights of 4 feet and 6 feet are intermixed to form the desired artificial reef structures. In FIGS. 2a, 2b and 3, the different sizes of structural unit are indicated by the hashed triangles for 6 feet and open triangles for 4 feet.

In FIGS. 2a and 2b, a single bar structure artificial reef formed from plurality of structural units 2 is illustrated. As can be seen, the structural units have intermixed sizes which are randomly distributed by dropping the structural units over the location at which the reef is to be formed. As illustrated in FIG. 2b, the bar arrangement does not consist of a single thickness wall of structural units, but is essentially a talus pile formed by dropping the structural units around the target point to form a bar with a width corresponding to the combined widths of structural units. In the preferred embodiment, a reef width of at least five structural units is needed to reduce the permeability of the reef to less than 5%. The height of the reef is determined by the ocean depth at the location of formation as well as the range of wave heights and wave periods. The seaward slopes of the artificial reefs are important in determining the amount of energy which can be focused on a given energy collector by the given reef shape.

The optimal wave form for both energy recovery and shore protection was found to be a plunging wave. The plunging wave was obtained when the slope of the reef was sufficiently steep to ensure a Carrier-Greenspan parameter less than 0.4 according to the equation:

$$\tan\beta > \left( \frac{\sigma^2 H_b}{0.4 g} \right)^{1/2} \quad (1)$$

Here, tan β is the slope of the bar, $H_b$ is the height of the breaking wave, σ is the radian frequency equal to 2π/T, where T is the wave period, and g is the acceleration of gravity. Consequently, the bar must be steeper as the wave heights increase or the wave periods decrease. If the reef slope is constrained for structural regions to some particular angle of repose, the tendency for plunging waves will increase as the wave period expands or the wave height decreases.

Figure 4:
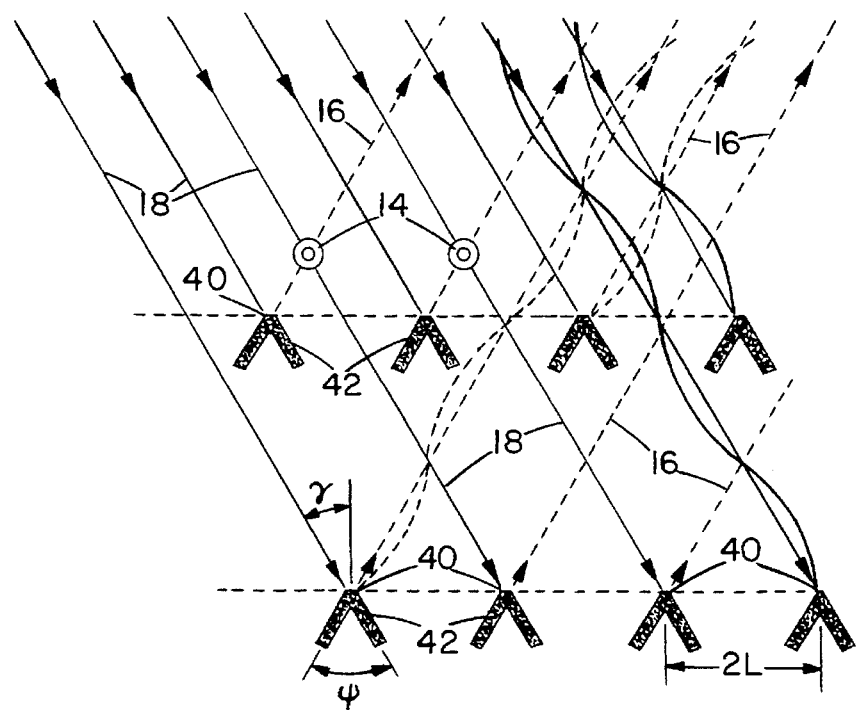
FIG. 4 is a top view of a multiple V-shaped bar arrangement.

To accommodate both average and extreme conditions, multiple reefs such as the parallel bar of FIG. 3 and V-shaped reefs of FIG. 4 may be required. Multiple reef configurations have the added advantage of providing unique wave structure interactions that can dramatically enhance the local wave height, as much as 80%.

In the case of the parallel bars 4 and 4' of FIG. 3, standing waves, indicated by wave rays 6, may become trapped between the bars and reinforce the incoming waves, indicated by wave rays 8. For non-normal incidence, the strongest reinforcement occurs where the rays of trapped waves 6, shown by the dotted lines, cross the wave rays 8 of the incoming swell, indicated by the solid lines. The wave energy collection devices should be placed in the region of the loci 30 for maximum energy recovery. Other wave effects resulting from the placement of the parallel bars include specular reflected waves, shown as wave rays 7, and non-specular leaky waves, shown as wave rays 9.

In the multiple V-bar configuration illustrated in FIG. 4, there is the possibility for appropriate spacings of the V-bars 42 to create Bragg reflection patterns. These complex interference patterns result in crossing wave rays which provide local concentrations in wave energy, indicated by "bright spots" 14, after multiple reflections between the various elements of the V-bar system. The bright spots 14 in this complex interference pattern are the focal points of the incident wave beams 18 and become the most efficient wave energy collection points.

Figure 5A:
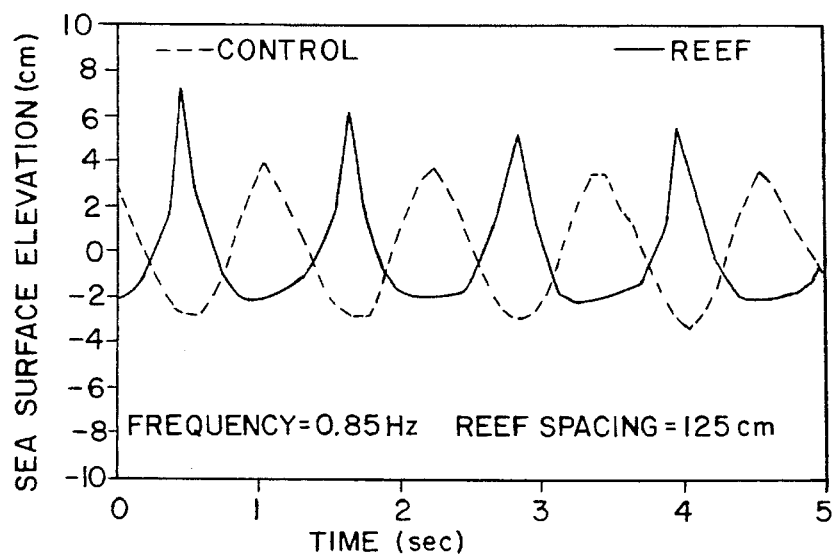
FIGS. 5a–5c are plots of wave enhancement by a parallel reef at frequencies of 0.85 Hz (FIG. 5a) and 0.95 Hz (FIG. 5b) with a reef spacing of 125 cm and at 0.70 Hz with a reef spacing of 105 cm (FIG. 5c)
Figure 5B:
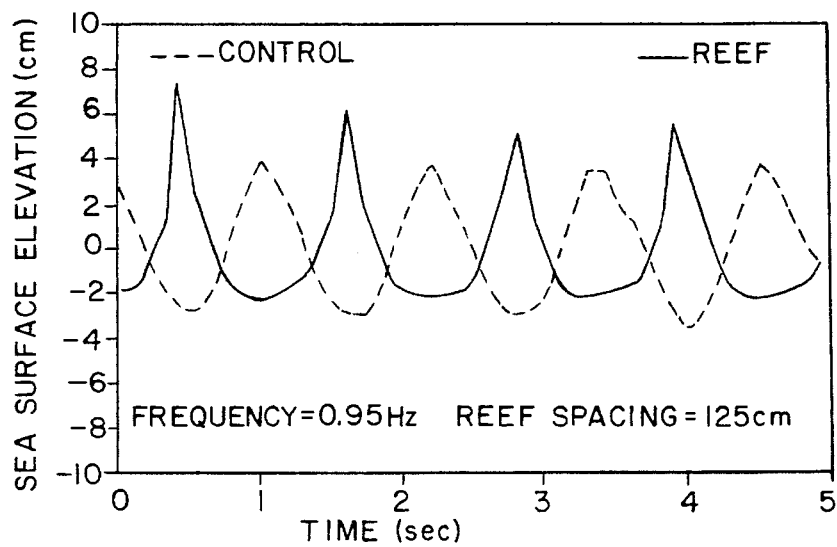
Figure 5C:
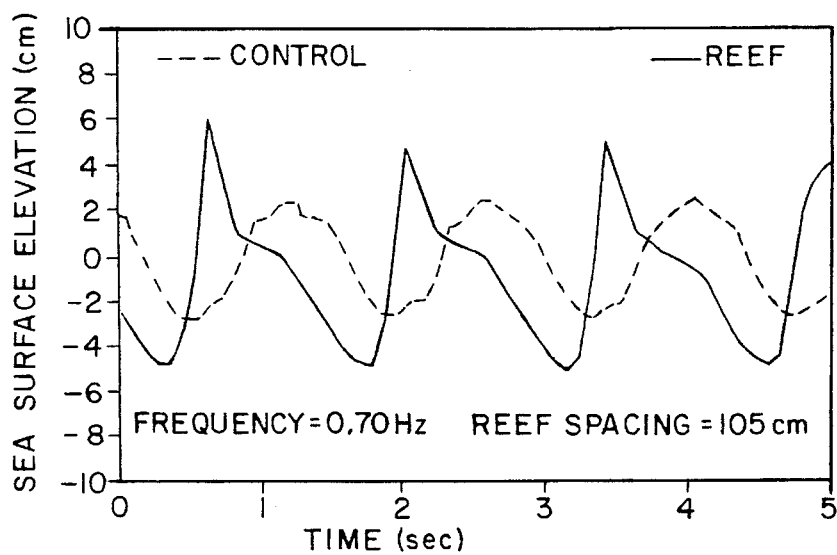

In FIG. 3, wave rays are diagrammed over a parallel bar configuration consisting of 4 and 4'. It has been found that for a given wave direction relative to the reefs, there is a particular frequency at which wave enhancement is especially vigorous. FIGS. 5a–5c provide comparative data of wave enhancement due to the parallel reefs at three different wave frequencies. In these plots, the solid lines (labeled "REEF") are measured by wave staffs in the trapping zone 12 between the parallel reefs 4 and 4', while the dotted lines (labeled "CONTROL") correspond to waves at a comparable depth along the undisturbed shore. In all cases, the heights of the waves are increased due to the presence of the parallel reefs 4 and 4', while at the same time, the peaks are made steeper and sharper.

For the higher frequency waves in FIG. 5a, the heights have been increased by nearly 87% over those of the control wave heights as a result of the energy trapping effects of the parallel reefs. A similar enhancement is seen at the slightly higher frequency illustrated in FIG. 5b.

For more complex sea states at lower frequencies, such as the conditions of FIG. 5c, the parallel reefs are shown to greatly increase the steepness of the waves. Again, the increase in wave heights relative to the undisturbed shore (control) ranges from 78–91%. By examining the power spectra of the data in FIG. 5c, it is apparent that increases in wave heights are the result of harmonics which are enhanced or trapped by the parallel reefs.

Figure 6A:
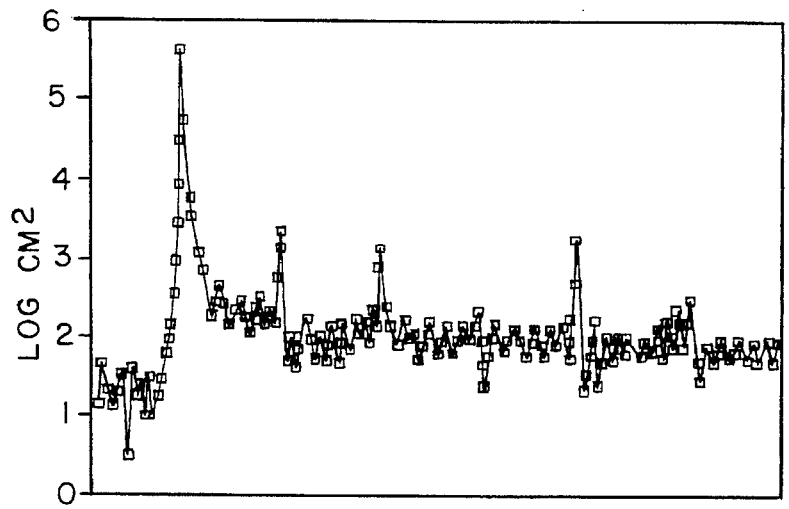
FIG. 6a is a plot of the power spectrum of the control wave from the structure of FIG. 5b.
Figure 6B:
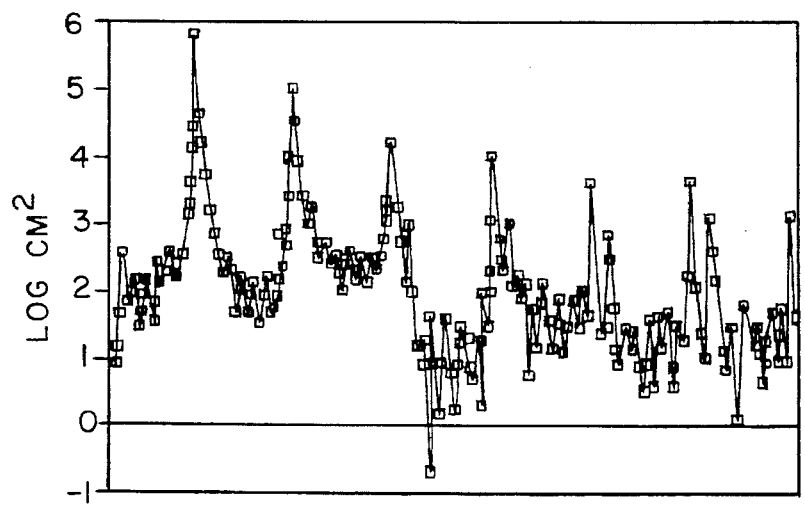
FIG. 6b is a plot of the power spectrum of the enhanced wave from the structure of FIG. 5b.

FIG. 6a is a plot of the power spectra in the control area of the undisturbed beach, while FIG. 6b shows the power spectra obtained between the two parallel reefs 4 and 4' in the energy trapping zone 12. Comparing the two plots, the harmonics in FIG. 6b are significantly enhanced from those of FIG. 6a. Because these harmonics are phase-locked to the fundamental frequency of the incoming waves, they act to reinforce the predominant peak, resulting in the very steep faces and increased wave heights shown in FIG. 5C.

Initial laboratory testing involved direct measurement and photography of the response of 1–2.5 second laboratory waves to model talus pile bars and reefs. These model reefs were constructed of concrete tetrahedrons of two sizes, 2" and 3". In certain modeled cases that involved local wave height doubling, the interactions induced in the laboratory from incident waves of 1 second period and 10 cm amplitude formed jets of water which rose as high as three feet in the air. This condition was observed for 1 m spacings between the parallel bars and a 12° wave angle. Video data of this condition was combined with wave staff measurements to provide the optimal reef separation as a function of the frequency of the incoming waves. This relationship is plotted in FIG. 7, where the solid line corresponds to the prediction based on linear theory for the formation of a trapped wave at some multiple of the incident wave lengths, as given by:

$$S = \frac{T}{2} \sqrt{gh} \cos\alpha \qquad (2)$$

Here, S is the separation between the bars (the width of trapping zone 12) in the on/offshore direction and a is the approach angle of the incoming swells.

Two physical phenomena combine to create the vigorous wave enhancement. The first is a trapping of the incident wave energy between the two bars 4 and 4' in the form of a standing wave. If this were the only mechanism, the data in FIG. 7 should allow the solve line prediction of linear theory. Therefore, another mechanism is clearly at work. That mechanism is the creation of a double caustic as a result of the change in the wave lengths.

Figure 8:
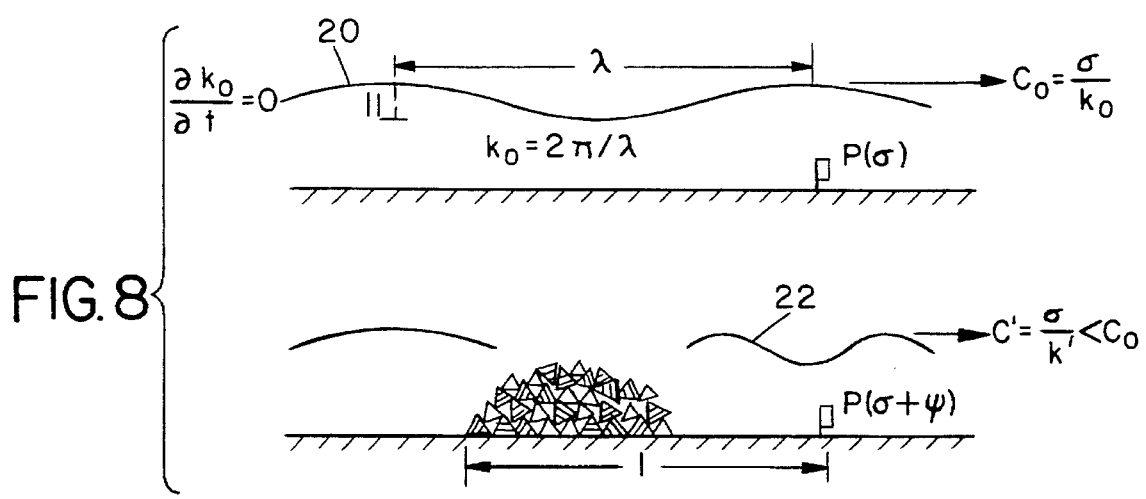
FIG. 8 is a plot illustrating the blue shift hypothesis.

The wave length is reduced by dissipative effects over the porous breakwater surfaces as the incoming and reflected waves refract over the tops of the bars. This is illustrated schematically in FIG. 8, in which an undisturbed incident wave 20 is compared against a wave 22 propagating over the reef 4. The phase speed of the incident wave 20 is $C_0$. Phase speed of the waves after passing over the reef 4 is C', which is slowed down due to the effects of friction over the reef.

Since the phase speed is simply a ratio of the radian frequency to the wave number, the phase speed can only be reduced by either reducing the frequency, or by increasing the wave number through wave length reduction. (The wave number is $2\pi$ over wavelengths.) However, according to the principle of stationary phases $$\frac{\partial k}{\partial t} + \nabla\sigma = 0 \qquad (3)$$

in steady state:

$$\frac{\partial k}{\partial t} = 0 \text{ so } \nabla\sigma = 0, \qquad (4)$$

so if the incoming wave train is steady, the frequency cannot change in space, i.e., $$C'(C_0 \text{ so } k')k_o. \qquad (5)$$

Therefore, the wave number must be increased due to friction, and the wave length is correspondingly reduced. This reduction in wave length can be estimated by applying the Lorentz Principle:

$$(C_{Do} = C_r |u|)u \sim \sigma fu \qquad (6)$$

hence, $$k' = k_0 \left( \frac{\sqrt{1+f^2} + 1}{2} \right)^{1/2} = k_0 + \frac{\phi}{1} \qquad (7)$$

The Lorentz Principle linearizes the drag effects of the reef in terms of units of virtual mass force or first order wave pressure. The resulting formulation gives rise to a blue-shift in wave number k' proportional to a dissipation coefficient f.

Figure 7:
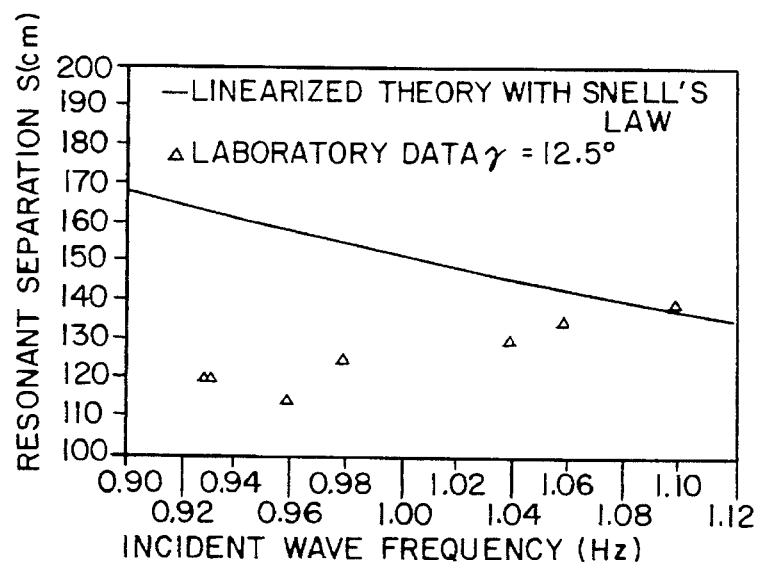
FIG. 7 is a comparison of predicted resonance separation for a parallel bar reef from linear theory versus measured laboratory results.

Because of this change in wave number or wave length, the data in FIG. 7 did not obey linear theory. Instead, the optimal separation distance in space 12 of FIG. 3 is proportional to the dissipation coefficient. The result is a double caustic at the points indicated by reference numeral 30, formed by the constructive interference between the incoming swell waves, the trapped standing waves 6 between the reefs 4 and 4' and the refracted waves with altered wave lengths. This constructive interference actually occurs between the two bars 4 and 4', although generally closer to the inshore bar 4. This positioning of the double caustic 30 insures that the optimal location 34 of the wave energy collectors occurs in the relatively deep area between parallel bars 4 and 4', rather than over them, thereby limiting the possibility of potential damage to the moorings of the collectors. Measurements of the onshore and inshore wave heights showed wave height nearly doubling due to the energy trapping and an 80% reduction of wave height inshore of the parallel bar system. Therefore, the double caustic 30 offers both enhanced wave energy recovery as well as an effective mechanism for providing shore protection.

Figure 9A:
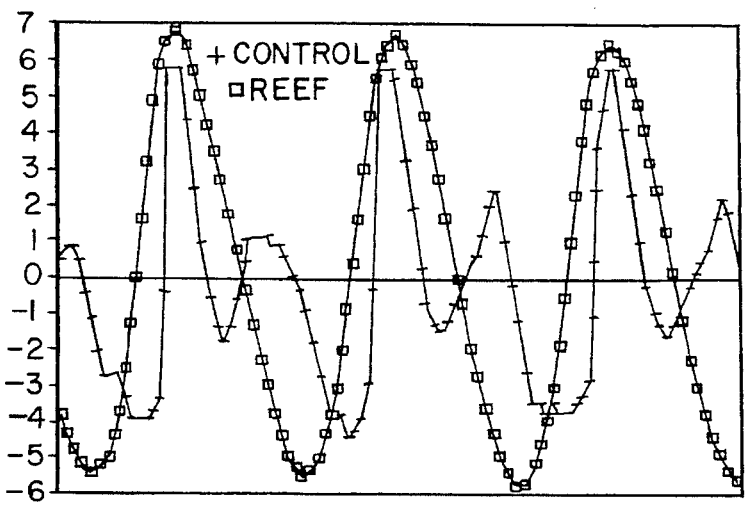
FIGS. 9a–9c are plots of alterations in wave characteristics caused by a V-bar reef for wave frequencies of 0.5 Hz (FIG. 9a), 0.7 Hz (FIG. 9b) and for a wave period of 1.6 seconds (FIG. 9c).
Figure 9B:
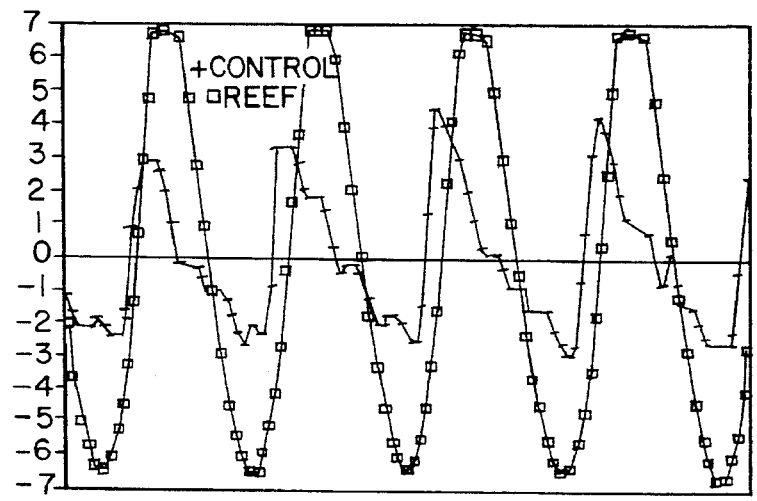
Figure 9C:
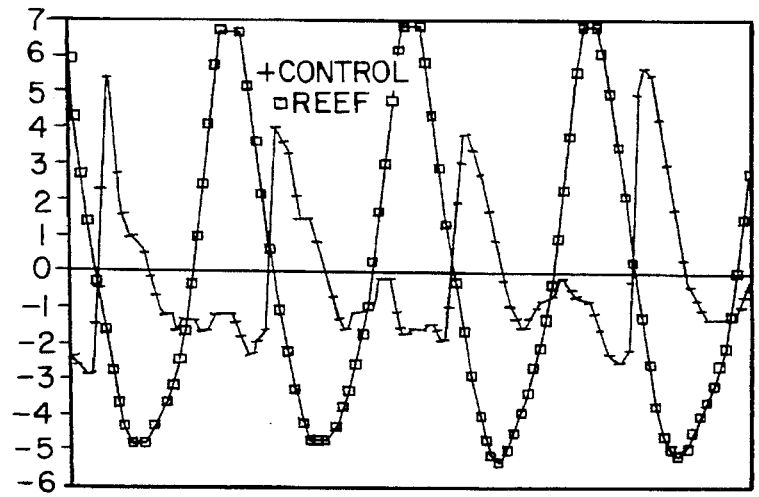

The other wave height enhancing reef geometry tested was the V-bar system illustrated in FIG. 4. The vertex 40 of the V-bar 42 is arranged seaward with the axis of the V orthogonal to the local depth contours. Incoming waves are focused near the vertex 40 of the V-bar 42 through local diffraction, acting to bend wave rays 16 perpendicular to the local surfaces of the bar and thereby creating a convergence of energy at the vertex 40. The constructive interference occurring at loci 14 enhances the wave height and power. Time series measured for the wave enhancing effects of the V-bar are shown in FIGS. 9a–9c. In these plots, the curves labeled CONTROL correspond to the control area on the undisturbed beach. The time series denoted with REEF were measured in the breaker zone of the V-bar. Waves having a low frequency on the order of 0.5 Hz (FIG. 9a) experience only modest increase in the breaker heights, on the order of 25–30%, as a result of the placement of the V-bar arrangement. At higher frequencies, in FIGS. 10 and 11, the breaker heights are nearly doubled by the convergence effects of the V-bar. Again, the wave form is steepened with the higher frequency lumps (surface chop) measured in the control area not being eliminated from those breakers in the V-bar.

In some cases at 0.7 Hz, shown in FIG. 9b, the V-bar more than doubles the incident wave height. Vertex angles ranging from 30°–160° were evaluated. The optimal range of vertex angles for the V-bar was found to be 120°, based upon the occurrence of quarter wavelength cancellation at $\lambda/4 = L\sin\gamma$, where 2L is the distance between two adjacent V-bars 42, $\lambda$ is the wavelength ($\lambda \sim T(gh)^{1/2}$), and $\gamma$ is the approach angle of the incident wave ray 18 with respect to the vertex 40. The vertex angle $\psi = 90° - \gamma$. The actual selection of vertex angles at a given site, however, will be controlled by the beach slope, with steep beaches requiring larger vertex angles. The large vertex angles on the steep beaches will cause the wave to shoal farther offshore with characteristics desirable for efficient energy recovery.

In order to obtain the highly dissipative plunging breakers that are optimal for energy recovery and shore protection alike, the reef slope and the water depth over the reef must be tailored to suit 4 particular sight parameters: (1) the wave height and (2) wave period resulting from the local wave climate, H and T; (3) the local tidal elevation η; and (4) the wave direction α. The reef slope must be adjusted according to some prevalent wave height, period and tidal range. To take advantage of wave height enhancing techniques such as the parallel bar and the V-bar, the design must also be tuned to the most prevalent wave directions α. Once these site-specific design wave conditions have been established, together with the tidal conditions, the reef geometry can be posed by Equation (1) and $$S = \frac{n\lambda}{2} \left( \frac{2}{\sqrt{1+f^2}+1} \right)^{1/2} \cos\alpha \qquad (8)$$

The wave forces on the structural units 2, which act to roll them, vary in response to local wave conditions according to the equation:

$$F = \frac{1}{2} l^2 \rho c_f \sigma^2 H^2 + \rho c_m \frac{4}{3} l^3 \sigma^2 \qquad (9)$$

where $c_f$ is the drag coefficient, $c_m$ is the virtual mass coefficient, p is the density of water, and 1 is the dimension of the structural unit 2. Experiments were conducted in the wind/wave channel to determine the drag and virtual mass coefficients in the above equation. During these experiments, frequencies varied 0.73 Hz–1.93 Hz. Wave heights were varied from 5–20 cm. This produced variations in wave lengths corresponding to deep water waves for the 0.73 Hz waves to the shallow water waves for the 0.195 Hz waves. The resulting virtual mass ($c_m$) and drag ($c_D$) coefficients obtained during these tests are compiled in Tables 1a–c and 2a–c for deep water waves, intermediate water waves and shallow water waves. Tables 1a and 2a provide the conditions under which the tests were run, Tables 1b and 2b are the virtual mass coefficients $c_m$ corresponding to Tables 1a and 2a, respectively. Tables 1c and 2c are the drag coefficients $c_D$ corresponding to Tables 1a and 2a.

TABLE 1C

| | $C_D = 2C_f$ | | | |
|---|---|---|---|---|
| | run 1 | run 2 | run 3 | run 4 |
| Deep Water Waves $\frac{kh}{2\pi} > 1/2$ | 45.31 | 45.58 | 45.67 | 46.17 |
| | 26.29 | 25.57 | 25.16 | 25.80 |
| | 18.41 | 18.16 | 18.41 | 18.26 |
| | 15.99 | 15.76 | 15.48 | 15.64 |
| Intermediate Water Waves $\frac{1}{200} < \frac{kh}{2\pi} < 1/2$ | 24.19 | 24.45 | 24.35 | 24.11 |
| | 12.44 | 12.66 | 12.61 | 12.69 |
| | 9.15 | 9.16 | 9.06 | 9.22 |
| | 7.26 | 7.37 | 7.56 | 7.58 |
| Intermediate Water Waves $\frac{1}{200} < \frac{kh}{2\pi} < 1/2$ | 15.61 | 15.72 | 15.99 | 16.24 |
| | 7.16 | 7.12 | 7.16 | 7.11 |
| | 4.39 | 4.46 | 4.46 | 4.45 |
| | 4.07 | 3.79 | 3.83 | 3.29 |
| Shallow Water Waves $\frac{kh}{2\pi} < 1/200$ | 3.16 | 3.17 | 3.19 | 3.19 |
| | 1.50 | 1.48 | 1.49 | 1.51 |
| | 1.16 | 1.19 | 1.17 | 1.18 |
| | 1.06 | 1.08 | 1.04 | 1.06 |

TABLE 1A

| | Freq (Hz) | H (cm) | k (cm$^{-1}$) | $k_2$ | $u_m D/u$ | $U_m T/D$ |
|---|---|---|---|---|---|---|
| Deep Water Waves $\frac{kh}{2\pi} > 1/2$ | 0.732 | 5 | 0.0216 | 0.216 | $0.409 \times 10^4$ | 0.167 |
| | 0.732 | 10 | 0.0216 | 0.216 | $0.785 \times 10^4$ | 0.322 |
| | 0.732 | 15 | 0.0216 | 0.216 | $1.128 \times 10^4$ | 0.462 |
| | 0.732 | 20 | 0.0216 | 0.216 | $1.408 \times 10^4$ | 0.577 |
| Intermediate Water Waves $\frac{1}{200} < \frac{kh}{2\pi} < 1/2$ | 0.586 | 5 | 0.0142 | 0.142 | $0.617 \times 10^4$ | 0.316 |
| | 0.586 | 10 | 0.0142 | 0.0142 | $0.173 \times 10^4$ | 0.600 |
| | 0.586 | 15 | 0.0142 | 0.142 | $1.749 \times 10^4$ | 0.895 |
| | 0.586 | 20 | 0.0142 | 0.142 | $2.203 \times 10^4$ | 1.28 |
| Intermediate Water Waves $\frac{1}{200} < \frac{kh}{2\pi} < 1/2$ | 0.391 | 5 | 0.0076 | 0.0757 | $0.835 \times 10^4$ | 0.640 |
| | 0.391 | 10 | 0.0076 | 0.0757 | $1.756 \times 10^4$ | 1.347 |
| | 0.391 | 15 | 0.0076 | 0.0757 | $2.608 \times 10^4$ | 2.000 |
| | 0.391 | 20 | 0.0076 | 0.0757 | $3.373 \times 10^4$ | 2.580 |
| Shallow Water Waves $\frac{kh}{2\pi} < 1/200$ | 0.195 | 5 | 0.0033 | 0.0333 | $1.027 \times 10^4$ | 1.580 |
| | 0.195 | 10 | 0.0033 | 0.0333 | $2.091 \times 10^4$ | 3.216 |
| | 0.195 | 15 | 0.0033 | 0.0333 | $2.965 \times 10^4$ | 4.560 |
| | 0.195 | 20 | 0.0033 | 0.0333 | $3.609 \times 10^4$ | 5.553 |

TABLE 1B

| | $C_m$ | | | |
|---|---|---|---|---|
| | run 1 | run 2 | run 3 | run 4 |
| Deep Water Waves $\frac{kh}{2\pi} > 1/2$ | 0.639 | 0.643 | 0.642 | 0.645 |
| | 0.699 | 0.689 | 0.699 | 0.695 |
| | 0.704 | 0.700 | 0.704 | 0.703 |
| | 0.763 | 0.758 | 0.752 | 0.754 |
| Intermediate Water Waves $\frac{1}{200} < \frac{kh}{2\pi} < 1/2$ | 0.636 | 0.635 | 0.634 | 0.636 |
| | 0.635 | 0.641 | 0.639 | 0.643 |
| | 0.694 | 0.694 | 0.690 | 0.696 |
| | 0.706 | 0.710 | 0.719 | 0.718 |
| Intermediate Water Waves $\frac{1}{200} < \frac{kh}{2\pi} < 1/2$ | 0.859 | 0.865 | 0.873 | 0.878 |
| | 0.811 | 0.807 | 0.810 | 0.808 |
| | 0.745 | 0.753 | 0.751 | 0.751 |
| | 0.803 | 0.803 | 0.781 | 0.720 |
| Shallow Water Waves $\frac{kh}{2\pi} < 1/200$ | 0.417 | 0.419 | 0.421 | 0.421 |
| | 0.408 | 0.404 | 0.409 | 0.409 |
| | 0.448 | 0.447 | 0.453 | 0.446 |
| | 0.491 | 0.481 | 0.495 | 0.491 |

TABLE 2A

| | Freq (Hz) | H (cm) | k (cm$^{-1}$) | k$_2$ | U$_m$D/u | U$_m$T/D |
|---|---|---|---|---|---|---|
| Deep Water | 0.732 | 5 | 0.0216 | 0.108 | 0.204 × 10$^4$ | 0.334 |
| Waves | 0.732 | 10 | 0.0216 | 0.108 | 0.393 × 10$^4$ | 0.644 |
| $\frac{kh}{2\pi} > 1/2$ | 0.732 | 15 | 0.0216 | 0.108 | 0.564 × 10$^4$ | 0.924 |
| | 0.732 | 20 | 0.0216 | 0.108 | 0.704 × 10$^4$ | 1.154 |
| Intermediate | 0.586 | 5 | 0.0142 | 0.071 | 0.308 × 10$^4$ | 0.632 |
| Water Waves | 0.586 | 10 | 0.0142 | 0.071 | 0.586 × 10$^4$ | 1.200 |
| $\frac{1}{200} < \frac{kh}{2\pi} < 1/2$ | 0.586 | 15 | 0.0142 | 0.071 | 0.874 × 10$^4$ | 1.790 |
| | 0.586 | 20 | 0.0142 | 0.071 | 1.101 × 10$^4$ | 2.256 |
| Intermediate | 0.391 | 5 | 0.0076 | 0.0379 | 0.417 × 10$^4$ | 1.280 |
| Water Waves | 0.391 | 10 | 0.0076 | 0.0379 | 0.878 × 10$^4$ | 2.694 |
| $\frac{1}{200} < \frac{kh}{2\pi} < 1/2$ | 0.391 | 15 | 0.0076 | 0.0379 | 1.304 × 10$^4$ | 4.001 |
| | 0.391 | 20 | 0.0076 | 0.0379 | 1.686 × 10$^4$ | 5.160 |
| Shallow Water | 0.195 | 5 | 0.0033 | 0.0167 | 0.513 × 10$^4$ | 3.161 |
| Waves | 0.195 | 10 | 0.0033 | 0.0167 | 1.045 × 10$^4$ | 6.432 |
| $\frac{kh}{2\pi} < 1/200$ | 0.195 | 15 | 0.0033 | 0.0167 | 1.482 × 10$^4$ | 9.122 |
| | 0.195 | 20 | 0.0033 | 0.0167 | 1.804 × 10$^4$ | 11.106 |

TABLE 2B

| | C$_m$ | | | |
|---|---|---|---|---|
| | run 1 | run 2 | run 3 | run 4 |
| Deep Water | 0.676 | 0.674 | 0.678 | 0.680 |
| Waves | 0.726 | 0.726 | 0.727 | 0.732 |
| $\frac{kh}{2\pi} > 1/2$ | 0.754 | 0.748 | 0.761 | 0.761 |
| | 0.749 | 0.746 | 0.754 | 0.746 |
| Intermediate | 0.675 | 0.688 | 0.689 | 0.691 |
| Water Waves | 0.708 | 0.685 | 0.700 | 0.709 |
| $\frac{1}{200} < \frac{kh}{2\pi} < 1/2$ | 0.662 | 0.656 | 0.659 | 0.663 |
| | 0.689 | 0.689 | 0.691 | 0.697 |
| Intermediate | 0.814 | 0.816 | 0.818 | 0.819 |
| Water Waves | 0.792 | 0.790 | 0.792 | 0.790 |
| $\frac{1}{200} < \frac{kh}{2\pi} < 1/2$ | 0.716 | 0.713 | 0.714 | 0.714 |
| | 0.671 | 0.665 | 0.672 | 0.666 |
| Shallow Water | 0.405 | 0.401 | 0.403 | 0.400 |
| Waves | 0.367 | 0.381 | 0.383 | 0.379 |
| $\frac{kh}{2\pi} < 1/200$ | 0.406 | 0.404 | — | 0.407 |
| | 0.416 | 0.411 | 0.426 | 0.414 |

TABLE 2C

| | C$_D$ = 2C$_f$ | | | |
|---|---|---|---|---|
| | run 1 | run 2 | run 3 | run 4 |
| Deep Water | 23.78 | 23.77 | 23.99 | 24.21 |
| Waves | 13.91 | 13.78 | 13.75 | 13.94 |
| $\frac{kh}{2\pi} > 1/2$ | 10.13 | 10.01 | 10.32 | 10.34 |
| | 7.30 | 7.22 | 7.41 | 7.52 |
| Intermediate | 14.57 | 14.98 | 15.13 | 15.20 |
| Water Waves | 8.43 | 7.93 | 8.25 | 8.48 |
| $\frac{1}{200} < \frac{kh}{2\pi} < 1/2$ | 4.41 | 4.34 | 4.37 | 4.42 |
| | 3.57 | 3.57 | 3.60 | 3.65 |
| Intermediate | 7.72 | 7.64 | 7.67 | 7.70 |
| Water Waves | 3.52 | 3.50 | 3.51 | 3.49 |
| $\frac{1}{200} < \frac{kh}{2\pi} < 1/2$ | 2.13 | 2.12 | 2.11 | 2.12 |
| | 1.55 | 1.53 | 1.55 | 1.55 |
| Shallow Water | 1.55 | 1.53 | 1.53 | 1.50 |
| Waves | 0.711 | 0.697 | 0.706 | 0.692 |
| $\frac{kh}{2\pi} < 1/200$ | 0.542 | 0.540 | — | 0.544 |
| | 0.468 | 0.466 | 0.483 | 0.470 |

The virtual mass coefficients were found to be surprisingly small, ranging from 0.4 to 0.9. However, the drag coefficients were found to be remarkably large, reaching as high as $c_d$=45. In order to provide a design safety margin to ensure that the reef maintains its integrity and remains in place, the most extreme values in drag coefficient and virtual mass coefficient were used for estimating the strength requirements of a prototype reef.

To satisfy the requirements of the extreme design wave, the minimum structural unit count for the talus pile according to Equation (9) with values from the tables is estimated to be 860 bags to construct a single V-bar reef, as shown in FIG. 4, or 1,825 structural units to construct a single parallel bar field.

The structural units and artificial reefs constructed therefrom of the present invention effectively concentrate or focus the incident wave energy at discrete locations so that wave energy can be efficiently channeled into collectors for conversion into usable power. The structural units are inexpensive and durable, can be easily installed at the desired site, and can be repositioned without major demolition and reconstruction efforts, as compared to a fixed form artificial reef. The parallel bar and V-bar configurations are designed to concentrate and amplify energy for improved efficiency of energy conversion. The structural units and artificial reefs constructed therefrom may also be used for protection of the shoreline from wave damage and as an alternative for levee and flood barrier construction.

It will be evident that there are additional embodiments which are not illustrated above but which are clearly within the scope and spirit of the present invention. The above description and drawings are therefore intended to be exemplary only and the scope of the invention is to be limited solely by the appended claims.

We claim:

1. An artificial reef structure for altering at least one of a wavelength, wave frequency, wave number and wave direction of incoming ocean waves for generating constructive interference between said incoming ocean waves to generate a wave having an enhanced height greater than a height of said incoming ocean waves, the artificial reef comprising:

a plurality of structural units disposed in at least one talus pile, said at least one talus pile having a reef height and a reef slope, each structural unit comprising a sandbag having a tetrahedron-shape with four corners wherein said plurality of structural units are randomly distributed within said at least one talus pile with respect to each other to form a plurality of irregular surfaces each having a plurality of raised corners and recessed spaces therebetween for receiving at least one of said corners therein so that at least a portion of said corners of each said structural unit fits within the recessed spaces defined by other structural units of said plurality of structural units so that said plurality of structural units is substantially interlocked and wherein said reef height is less than said incoming wave height and is adapted to induce drag on said incoming ocean waves to diffract the incoming ocean waves to a pre-selected location to cause the incoming ocean waves to constructively interfere at the pre-selected location.

2. An artificial reef structure as in claim 1, wherein said sandbag comprises a durable polymer fabric formed into a tetrahedron-shaped bag filled with sand.

3. An artificial reef structure as in claim 1, wherein said plurality of structural units comprises at least two groups of structural units, each group having different dimensions from other groups.

4. An artificial reef structure as in claim 1, wherein said at least one talus pile comprises two parallel bars aligned generally parallel to a shoreline and separated by a spacing to cause a plurality of trapped standing waves to be formed within said spacing where said plurality of standing waves are combined with a plurality of incoming swell waves.

5. An artificial reef structure as in claim 1, wherein said at least one talus pile comprises a plurality of V-shaped bars, each V-shaped bar having a vertex and an axis, wherein said axis is disposed orthogonal to local depth contours.

6. An artificial reef structure as in claim 5, wherein said vertex has an angle within the range of 30°–160° and said angle is selected according to a slope of an adjacent beach, with a steep beach requiring a larger vertex angle.

7. An artificial reef structure as in claim 1, wherein said at least one talus pile has a width comprising at least five structural units.

8. An artificial reef structure as in claim 1, wherein said reef slope is determined according to the relationship $$\tan\beta > \left( \frac{\sigma^2 H_b}{0.4 g} \right)^{1/2}$$

where $\tan \beta$ is said reef slope, $H_b$ is said incoming ocean wave height, $\sigma$ is the radian frequency equal to $2\pi/T$, where T is a wave period of said incoming ocean waves, and g is the acceleration of gravity.

9. An artificial reef structure as in claim 8, wherein said spacing (S) is determined according to the relationship $$S = \frac{n\lambda}{2} \left( \frac{2}{\sqrt{(1+f^2)}+1} \right)^{1/2} \cos\alpha$$

where n is a local tidal elevation, $\lambda$ is said wavelength, f is said wave frequency and $\alpha$ is said wave direction.

* * * * *